Figure 1:
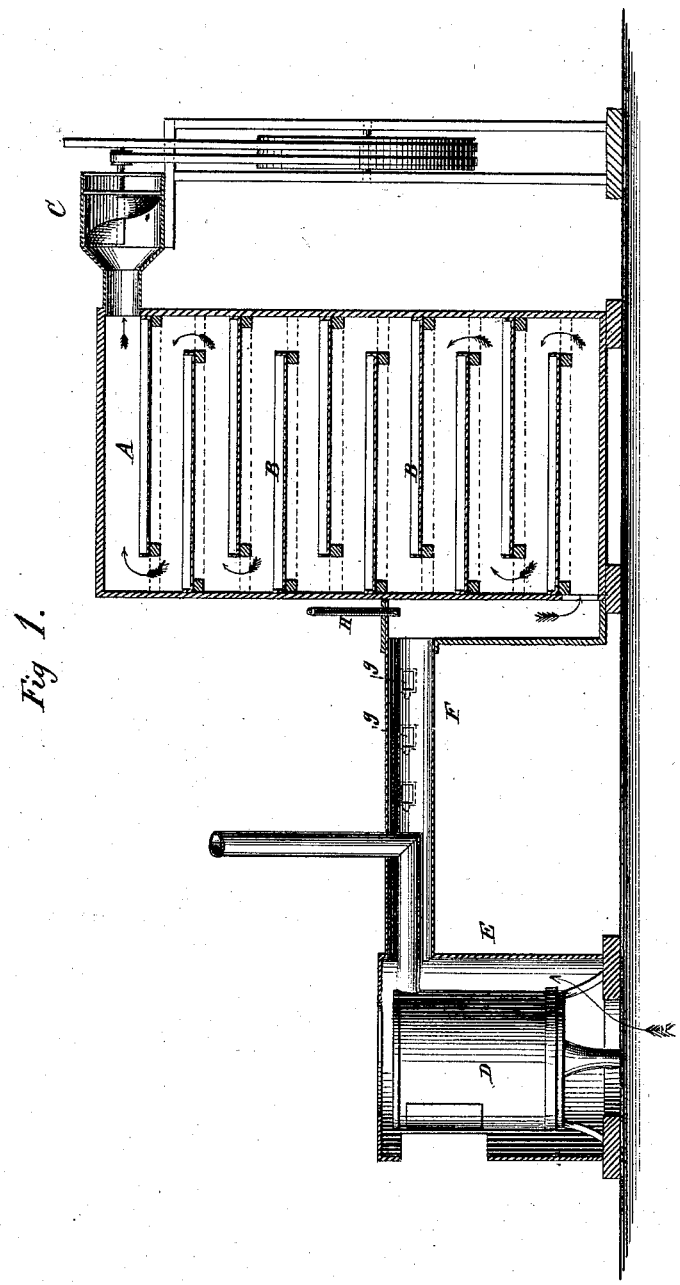

T. O. ALSING.
Manufacture of Albumen from Fish-Spawn.

No. 219,667.  Patented Sept. 16, 1879.

Witnesses:
Milton J. Roberts
A. Maconnell

Inventor
Tolf Oscar Alsing
by A. W. Almqvist
Attorney.

UNITED STATES PATENT OFFICE.

TOLF OSCAR ALSING, OF KÖPING, SWEDEN, ASSIGNOR TO HIMSELF AND JOHAN ROBERT ALSING, OF HOBOKEN, NEW JERSEY.

IMPROVEMENT IN MANUFACTURE OF ALBUMEN FROM FISH-SPAWN.

Specification forming part of Letters Patent No. 219,667, dated September 16, 1879; application filed June 5, 1879.

*To all whom it may concern:*

Be it known that I, TOLF OSCAR ALSING, of the town of Köping, in the Kingdom of Sweden, have invented a new and useful Improvement in the Manufacture of Albumen, of which the following is a specification.

My invention relates to an article of merchandise known in commerce under the name "albumen," the best quality of which has heretofore been made from the whites of hens' eggs, and is used principally in the manufacture of dyes and colors for printing on cloth, paper-hangings, &c. A poorer quality is made from ox-blood, and used in the manufacture of sugar. Albumen of the whites of hens' eggs is used in all so-called genuine and fast colors, and its high price is the main source of their expensiveness, which again causes the very general use of the cheaper but dangerous poisonous colors.

The object of my invention is to produce an albumen or article of manufacture of superior and sufficient excellence to replace that made of hens' eggs at a cost low enough to allow of dispensing with the use of loose and poisonous colors.

The invention consists in a commercial albumen made from fish-spawn, and in the process of manufacturing the same, as will be hereinafter described and claimed.

The accompanying drawing, which is simply to illustrate a part of the process, represents a longitudinal vertical section of an evaporating apparatus, such as may be used in the manufacture.

Owing to the abundance of fish-spawn and its richness in albuminous matter, its utilization for the manufacture of commercial albumen is a great desideratum. After years of labor and expensive experiments I have at last succeeded in its accomplishment by the invention of the following simple process:

The spawn-bags (the spawn inclosed in its natural covering) are first rinsed in water, then placed upon a board, and their coverings cut open; after which they are placed in a tank containing one-half of the quantity of water designed to operate with. They are left to remain in this water for about six hours, during which time the water is kept in constant slight commotion, not strong enough, however, to cause any movement of the spawn-bags. This water is then drawn off, and (containing albumen in solution mixed with blood) yields, by subsequent treatment, the second albumen, as will be hereinafter explained. The bags or coverings of the spawn are then carefully unfolded, and the spawn, (the ova,) separated from them by means of a wooden knife, is crushed in a mill, or between rollers, and mixed with twice its weight of water. The mixture is then well stirred up and placed in a centrifugal machine, revolving at about three hundred revolutions a minute. The liquid expressed by the centrifugal power and trickling from the machine contains albumen dissolved in water. This liquid is then placed in a tank and left for twelve hours to settle. At the end of that time there will be found deposited on the bottom of the tank two layers, the lower one of which is turbid and the upper clear. The upper clear liquid is then drawn off separately, poured into pans B of hardened glass, and thus placed in an evaporating apparatus, A, kept at a temperature of 45° centigrade. After evaporation to dryness it yields albumen No. 1, or first quality. The albuminous water drawn off from the spawn after six hours agitation, as before stated, is dried in pans B in precisely the same manner, and yields albumen No. 2, or second quality. The turbid bottom layer, before mentioned, is dried in the same manner, and yields albumen No. 3, or third quality.

The heat necessary for the rapid evaporation may be derived from a furnace or other heater, D. The air entering the space between the heater D and the surrounding drum E is heated, and passes through the pipe F into the evaporator A, where it circulates around the pans B until it is drawn off by the revolving fan C, which increases the current and promotes evaporation.

The heat may be regulated by automatic valves or dampers $g$ in the pipe F to the required 45°, the temperature being indicated by the thermometer H.

The substance remaining in the centrifugal machine after expressing the albuminous liquid yielding albumen No. 1 is treated for fifteen minutes with a solution of one part supermanganate of potash in thirty parts of water. The mixture is then again put in the centrifugal machine and the solution of supermanganate of potash expressed by rapid revolution of the machine. The substance remaining in the filter is then treated with sulphurous acid, by which it becomes, when treated with water and boiled to dryness, a by-product, (gelatine.)

Having thus described my invention, I claim as new and desire to secure by Letters Patent—

The process for manufacturing commercial albumen—viz., by the washing, crushing, extraction, separation, and evaporation of fish-spawn, substantially as hereinbefore set forth.

The above specification of my invention signed by me this 20th day of April, 1879.

TOLF OSCAR ALSING.

Witnesses:
  A. L. GELLIN,
  C. J. LINDGUIST.